US012589342B2

(12) United States Patent
Niemelä et al.

(10) Patent No.: US 12,589,342 B2
(45) Date of Patent: Mar. 31, 2026

(54) FILTER SHEET MEDIA AND METHOD FOR MANUFACTURING A FILTER SHEET MEDIA

(71) Applicant: Ahlstrom Oyj, Helsinki (FI)

(72) Inventors: Harri Niemelä, Kouvola (FI); Hanna Rahiala, Kotka (FI); Rami Haakana, Kotka (FI); Juha Sorvari, Kotka (FI); Andrea Corradi, Turin (IT); Andrea Grosso, Turin (IT); Andrea Frillici, Sassoferrato (IT); Francesco Stopponi, Fabriano (IT)

(73) Assignee: AHLSTROM OYJ, Helsinki (FI)

( * ) Notice: Subject to any disclaimer, the term of this patent is extended or adjusted under 35 U.S.C. 154(b) by 0 days.

(21) Appl. No.: 18/248,163

(22) PCT Filed: Oct. 7, 2021

(86) PCT No.: PCT/IB2021/059221
§ 371 (c)(1),
(2) Date: Apr. 6, 2023

(87) PCT Pub. No.: WO2022/074611
PCT Pub. Date: Apr. 14, 2022

(65) Prior Publication Data
US 2023/0381698 A1      Nov. 30, 2023

(30) Foreign Application Priority Data
Oct. 8, 2020      (FI) ..................................... 20205988

(51) Int. Cl.
*B01D 39/00*      (2006.01)
*B01D 39/20*      (2006.01)

(52) U.S. Cl.
CPC ...... *B01D 39/2024* (2013.01); *B01D 2239/10* (2013.01); *B01D 2239/1233* (2013.01)

(58) Field of Classification Search
CPC ............ B01D 39/2024; B01D 2239/10; B01D 2239/1233; B01D 2239/0636;
(Continued)

(56) References Cited

U.S. PATENT DOCUMENTS 9,656,196 B2      5/2017   Sato et al.
9,885,154 B2      2/2018   Gupta
(Continued)

FOREIGN PATENT DOCUMENTS

CN      16638154 A      5/2017
CN      105350376 B      6/2018
(Continued)

OTHER PUBLICATIONS

International Search Report for International Patent Application No. PCT/IB2021/059221, International Filing Date Oct. 7, 2021, Date of Mailing Feb. 2, 2022, 4 pages.
(Continued)

*Primary Examiner* — T. Bennett Mckenzie
(74) *Attorney, Agent, or Firm* — CANTOR COLBURN LLP

(57) ABSTRACT

A filter sheet media (1) for air/gas filtering applications fulfilling the criteria of standard EN779:2012 class M6 filter media, the filter sheet media (1) comprises: a first group of glass fibers (20) having a fiber diameter in a range of greater or equal to 6 μm up to 20 μm; a second group of glass fibers (30) having a fiber diameter in a range of 0.2 μm to less than 6 μm; a binder (40); the second group of glass fibers (30) have a fiber distribution gradient over the thickness (13) of the filter sheet media (1) so that the second group of glass fibers (30) are distributed through the thickness (13) of the filter sheet media (1), the filter sheet media (1) having more
(Continued)

second group of glass fibers (30) near the first surface (11) than the second surface (12). Also disclosed is a method for manufacturing.

17 Claims, 2 Drawing Sheets

(58) Field of Classification Search
CPC ........ B01D 2239/086; B01D 2239/125; B01D 39/2017; B01D 46/10; B01D 46/103; B01D 46/403; B01D 46/52; B01D 2239/0208; B01D 2239/083; B01D 2258/06; B01D 39/14; B01D 39/2003
USPC .......................................................... 55/522
See application file for complete search history.

(56) References Cited

U.S. PATENT DOCUMENTS

| | | | |
|---|---|---|---|
| 9,950,284 | B2 | 4/2018 | Thomson et al. |
| 10,022,657 | B2 | 7/2018 | Godsay et al. |
| 10,569,508 | B2 | 2/2020 | Manville |
| 11,273,399 | B2 | 3/2022 | Kaukopaasi et al. |
| 2005/0160711 | A1 | 7/2005 | Yang |
| 2006/0242933 | A1* | 11/2006 | Webb ................... B01D 46/521 |
| | | | 55/486 |
| 2009/0050578 | A1 | 2/2009 | Israel et al. |
| 2010/0187171 | A1* | 7/2010 | Gupta .................... D21F 11/14 |
| | | | 210/491 |
| 2010/0212272 | A1 | 8/2010 | Sealey et al. |
| 2010/0252510 | A1 | 10/2010 | Godsay |
| 2014/0123613 | A1* | 5/2014 | Le Port ................ B01D 39/163 |
| | | | 55/528 |
| 2018/0361712 | A1 | 12/2018 | Nandi et al. |
| 2019/0329169 | A1 | 10/2019 | Umminger |
| 2020/0254367 | A1 | 8/2020 | Battenfeld et al. |

FOREIGN PATENT DOCUMENTS

| | | |
|---|---|---|
| EP | 1461494 B1 | 5/2007 |
| EP | 3120915 A1 | 1/2017 |
| EP | 2401146 B1 | 12/2020 |
| JP | H05123513 A | 5/1993 |
| JP | 2018150671 A5 | 2/2019 |
| KR | 100877902 B1 | 1/2009 |
| WO | 2016081691 A1 | 5/2016 |
| WO | 2017008171 A1 | 1/2017 |

OTHER PUBLICATIONS

Office Action issued for Finnish Patent Application No. 20205988, Filing Date Oct. 8, 2020, Date of Mailing May 3, 2021, 5 pages.
Written Opinion for International Patent Application No. PCT/IB2021/059221, International Filing Date Oct. 7, 2021, Date of Mailing Feb. 2, 2022, 8 pages.
Office Action in European Patent Application No. 21805604.2, Mailing Date: Jan. 25, 2024, 7 pages.

\* cited by examiner 20, 30

30

20

FILTER SHEET MEDIA AND METHOD FOR MANUFACTURING A FILTER SHEET MEDIA

CROSS REFERENCE TO RELATED APPLICATIONS

This application is a National Stage application of PCT/IB2021/059221, filed Oct. 7, 2021, which claims the benefit of Finnish Patent Application No. 20205988, filed Oct. 8, 2020, both of which are incorporated by reference in their entirety herein.

TECHNICAL FIELD

The present disclosure relates to a filter sheet media for air and gas filtering applications. The present disclosure relates also to a method for manufacturing a filter sheet media for air and gas filtering applications.

More particularly, the present disclosure relates to a filter sheet media for air and gas filtering applications, the filter sheet media comprises at least the following components: a first group of glass fibers having a fiber diameter in a range of greater or equal to 6 μm up to 20 μm; a second group of glass fibers having a fiber diameter in a range of 0.2 μm to less than 6 μm; a binder for adhering the first group of glass fibers to each other and further adhering the second group of glass fibers to the first group of glass fibers; wherein the components have formed as a filter sheet media having a first surface and a second surface and a thickness in a direction perpendicular to the first surface and the second surface, the filter sheet media fulfills at least criteria of standard EN779:2012 class M6 filter media.

The present disclosure relates also to a method for manufacturing a filter sheet media for air and gas filtering applications, the filter sheet media fulfills at least criteria of standard EN779:2012 class M6 filter media.

BACKGROUND

Filter sheet media is a sheet-like material that is intended to be used in filters, as a filtering material. The sheet of filter material, here filter sheet media, may be set as planar, folded, corrugated, configured in a spiral form, wave form or any other configuration to form a filter together with a construction holding the filter sheet media. The air or gas to be filtered may be led along the filter and at some stage of the filtering, the air or gas is led through the filter. In most filters the basic idea is first to capture large particles and then smaller particles and at the last stage capture the smallest particles. To be able to perform this function, filter sheet media has a first surface and a second surface and a thickness in a direction perpendicular to the first surface and the second surface.

A prior art publication is WO-2017/049043A1 disclosing a filter media including a waved filtration layer. The filtration layer is held in a waved configuration by a support layer. In some embodiments, the filtration layer may have a combination of characteristics (e.g., mean flow pore size, basis weight, amongst others) that can lead to enhanced filtration performance (e.g., reduced air permeability decrease), in particular, in high humidity environments. The filter media may be used to form a variety of filter elements for use in various applications, including air filtration, hydraulic or other liquid filtration.

An object of the disclosure is to provide a filter sheet media for air and gas filtering applications in which the performance is improved compared to the prior art solutions. An object of the disclosure is to achieve improved filtering performance with reduced costs of manufacturing the filter sheet media. Another object is to achieve similar filtration properties than a state of the art filter sheet media has but with reduced amount of second group of glass fibers e.g., micro glass fibers. Still another object of the disclosure is to provide a filter sheet media that enables long service time in filtering. Further an object of the disclosure is to provide a manufacturing method for the filter sheet media as disclosed herein.

Another object of the present disclosure is to provide a filter sheet media that fulfills at least the criteria of standard EN779:2012 class M6 filter media or even higher, such as F7, F8 or F9. The EN779:2012 standard has been used in Europe to characterize the filtration efficiency of the filters for the ventilation of buildings. EN779:2012 rates nine classes of filters into 3 groups: coarse filters: "G1, G2, G3 and G4", medium filters: "M5 and M6" and fine filters: "F7, F8 and F9". It defines the M and F-filtration classes according to the average filtration efficiency of the particles with a diameter of 0.4 μm. According to this standard M6 class filter media is in the medium group and has average particle size efficiency ($E_m$) of $60\% \leq E_m < 80\%$ for 0.4 μm particles at final pressure drop of 450 Pa. The characterizing method is not discussed here in detail since that is disclosed in detail in said standard.

SUMMARY

Objects of the disclosure can be met substantially as is disclosed in the independent claims and in the other claims describing more details of different embodiments of the disclosure.

According to an embodiment of the disclosure the filter sheet media composition comprises: the first group of glass fibers having a fiber diameter in a range of greater or equal to 6 μm up to 20 μm, the amount of the first group of glass fibers being from 60 wt % (weight %) to 90 wt % of the fiber content of the filter sheet media; the second group of glass fibers having a fiber diameter in a range of 0.2 μm to less than 6 μm, the amount of the second group of glass fibers being from 10 wt % to 40 wt % of the fiber content of the filter sheet media; and the second group of glass fibers have a fiber distribution gradient over the thickness of the filter sheet media so that the second group of glass fibers are distributed through the thickness of the filter sheet media, the filter sheet media having more second group of glass fibers near the first surface than the second surface.

According to an embodiment of the disclosure the method comprises steps of: preparing furnish for the filter sheet media, which comprises at least the following components: a first group of glass fibers having a fiber diameter in a range of greater or equal to 6 μm up to 20 μm, the amount of the first group of glass fibers being from 60 to 90 wt % of the fiber content of the filter sheet media; a second group of glass fibers having a fiber diameter in a range of 0.2 μm to less than 6 μm, the amount of the second group of glass fibers being from 10 to 40 wt % of the fiber content of the filter sheet media; a binder for adhering the first group of glass fibers to each other and further adhering the second group of glass fibers to the first group of glass fibers; providing the furnish as a foam suspension to a web forming machine, to be formed as a web of filter sheet media having a first surface and a second surface and a thickness in a direction perpendicular to the first surface and the second surface; and wherein the second group of glass fibers are distributed by a foam laid process so that the second group of glass fibers forms a fiber distribution gradient over the thickness direction of the filter sheet media, the filter sheet media having more second group of glass fibers near the first surface than the second surface.

First group of glass fibers are formed of single glass fibers which are typically chopped, cut or stapled to an even length or such fibers bundled or tangled together. The first group of glass fibers has a fiber diameter in a range of greater or equal to 6 µm up to 20 µm, and a typical length in a range of 3 mm to 20 mm. Within the same group there may be one or several different sub-groups or sets of glass fibers fulfilling the criteria of the first group of glass fibers, such as one sub-set of 6 µm diameter and 6 mm long glass fibers and another sub-set of 12 µm diameter and 20 mm long glass fibers.

Second group of glass fibers are formed of individual glass fibers or glass fibers bundled or tangled together. The second group of fibers has a fiber diameter in a range of 0.2 µm to less than 6 µm. Within the same group there may be one or several different sub-groups or sets of glass fibers fulfilling the criteria of the second group of glass fibers, such as one sub-set of 5.6 µm diameter glass fibers and another sub set of 1.2 µm diameter glass fibers. The term second group of glass fibers is used in the present disclosure for those fibers meeting this definition.

This provides a filter sheet media that can be used in various air and gas filtration applications where the performance is considerably improved. By having a fiber distribution gradient structure of the second group of glass fibers across the thickness direction of the filter sheet media it is possible to achieve good properties for filtration and the obtained product can be called as EN779:2012 class M6 filter sheet media.

The conventional products also cost more due to slower machine speed and higher amounts of micro glass fibers. In addition, using a large amount of the first group of glass fibers gives the present filter sheet media a higher tensile strength. This is reflected in an examples table later, where the experimental samples have higher tensile strength than the comparative examples. There may be some alternatives in manufacturing such a gradient structure, but with a foam process it is possible to achieve required properties for a M6 filter media with lower amount of micro glass fibers (here defined as a second group of glass fibers); even with from 10 wt % up to 40 wt % of fiber furnish. In some embodiments, less than 30% of fiber furnish may be second group of glass fibers. With higher amounts of the second group of glass fibers it is possible to reach even higher performance grades of filter sheet media, such as EN779:2012 class F7.

An advantage of the foam forming process compared to typical wetlay is also that the foam forming gives better formation and high efficiency to the product. It has been noted that in conventional wet laid product, a much higher amount, even up to and above 80 wt %, of micro glass fibers may be needed to meet the M6 filtration requirements. Another advantage of the foam forming process compared to typical wetlaid process is that higher percentages of the fibers longer than 10 mm can be used while maintaining a good formation in the media, resulting in a stronger media. In a particular embodiment of the disclosure the foam forming process provides desired formation of the long fibers belonging to the first group of glass fibers and enabling to produce a strong but flexible filter sheet media having suitable permeability.

The filter sheet media of the present disclosure also has a density gradient, wherein there are is a change in density along the thickness of the media, with more fibers distributed nearer to one side or surface of the media.

The filter sheet media of the present disclosure is particularly suitable for use in air and gas filtration applications including gas turbine filters and HVAC filters. The filter sheet media of the present disclosure may be also suitable for other filtration applications including hydraulic filters, other liquid filters and battery separators. The media of the current disclosure is stronger and more economic to produce. In some embodiments, higher production efficiencies can be achieved.

A suitable basic method and device for manufacturing the present disclosure are disclosed in the applicant's own EP 1,461,494 B1. It discloses a method for performing foam web forming, wherein: a fibrous foam suspension is formed which includes solids; the fibrous foam suspension is introduced from a head box of a production machine into a web forming section thereof, and a fibrous web is formed in said web forming section by removing foam from the fibrous foam suspension through at least one wire located in the web forming section; the fibrous foam suspension is formed by: introducing at least a part of the solids needed for forming said fibrous foam suspension into said headbox in an essentially dry state; introducing a foam at a high pressure from nozzles into the head box, and mixing the solids into the foam in said headbox. The patent discloses also a suitable apparatus for performing foam web forming, the apparatus comprising: a head box comprising lip openings and means for receiving foam, so as to form therein a fibrous foam suspension which includes solids, and a web forming section for forming a web from the fibrous foam suspension, the web forming section comprising at least one wire and foam removal means located on the side of the wire opposite to the formed web, the head box further comprises: means for introducing at least a part of the solids needed for forming said fibrous foam suspension into said headbox in an essentially dry state, and pressurized feeding nozzles for spraying a foam into the head box and for mixing said essentially dry solids into the foam in order to form the fibrous foam suspension.

Another suitable basic method and device for manufacturing the present disclosure is disclosed for example in the applicants own U.S. Pat. No. 6,531,078 B1. In the patent it is disclosed a method of producing a non-woven web of fibrous or particulate material comprising: formation of a foam slurry; deposition of that slurry onto a foraminous element having a three-dimensional mold; and formation of a web having a three-dimensional shape that is not substantially planar by removal of foam from the slurry through the foraminous element and drying the web. An apparatus therefore is also disclosed. The method may be used in production a variety of products, including automotive pleated fluid and air filters, pleated heating and/or air conditioning (HVAC) filters, shaped breathing mask filters and bacterial filters, laminated cleaning products with superabsorbent middle layers, such as a mop wipe shape to fit a cleaning mop head, and other products.

In an embodiment of the present method is a foam process, a special gradient structure is formed by using a single layer inclined wire headbox, the formation of the web is done by using a twin wire inclined former. During the formation process, the inventors have found that the second group of fibers is positioned in more amount against formation wire (in this embodiment the first surface) thus creating a tighter structure while the top side (in this embodiment the second surface) is more open with less amount of the second group of glass fibers. This gradient structure is beneficial to improve filtration performance and efficiency of the end product.

In another embodiment of the method, the gradient structure is formed by using multilayer headbox. The first group of glass fibers are provided from a foam suspension from one layer of the headbox and the second group of glass fibers are provided from a foam suspension from another layer of the headbox. It depends on the actual machine configuration (such as single layer or multilayer headbox) if the first surface is in the production machinery actually a "wire side" or a "top side" or vice versa, if the surfaces or sides are discussed in conventional terms of this type of production machinery. It may be produced either way.

Definitions: Filter sheet media is a sheet like material that is intended to be used in filters, as a filtering material. The sheet of filter material, here filter sheet media, may be set as planar, folded, corrugated, configured in a spiral form, wave form or any other configuration to form a filter together with a construction holding the filter sheet media. Filter sheet media may be produced as a continuous web and then cut to sheets but also any suitable single sheet manufacturing method may be used.

Micro glass fibers is used herein to refer a material similar to the second group of glass fibers. Microglass fibers are typically A-type or E-type glass fibers made using a rotary or flame attenuation process, having an average fiber diameter in the range of about 0.2 μm to 6 μm.

Fiber diameter refers to the width of a fiber. The average diameter of a group of fibers can be measured by techniques known to those skilled in the art, e.g. microscopy. The diameters of a group of fibers may have any suitable distribution. In some embodiments, the diameters of the group of fibers are substantially the same. In other embodiments, the diameters of the group of fibers may follow a distribution (e.g., log normal, Gaussian, etc.). There may be considerable variation in the actual measured fiber diameter distribution depending on the manufacturing method, as explained by scientific article by Jon F. Bauer, Johns Manville Technical Center "Properties of Glass Fiber for Filtration: Influence of Forming Process" (2004). This may apply more to the second group of glass fibers (micro glass fibers). The fiber diameter of the first group of glass fibers having the fiber diameter of 6 μm to 20 μm is typically very even and does not have considerable variations due to the manufacturing process. Most typically, the first group of fibers is made with a drawing method, where the molted glass is drawn through fixed diameter orifices in a platinum plate.

Binder means in this disclosure a material or substance capable of binding the first group of glass fibers and the second group of glass fiber together within the same group or with the other group. The binder may comprise one or more components to have effect on binding properties, the strength of the filter sheet media, hydrophobic/hydrophilic properties, retention properties or foam forming properties. The binder may be selected from a group of acrylates, such as styrene acrylate, acrylic acid resin, or ethylene vinyl acetate, polyvinyl acetate, polyvinyl alcohol, starch, styrene butadiene, urea formaldehyde resin, melamine formaldehyde resin, polyurethanes, polycarbonates, saturated polyesters, unsaturated polyesters, polyterpenes, furan polymers, polyamidimides, polyamidoamines, copolymers thereof, and combinations thereof. According to an embodiment the filter sheet media comprises binder 10 to 20 wt % of the total weight of the filter sheet media. The binder may be in a suspension, solution, liquid or partly or wholly in a solid or fiber form (e.g., as bicomponent-binder fibers).

Fiber distribution gradient refers to a ratio of the amount of fibers from a group in the first surface compared to the amount of the fibers from that same group in the second surface. In the current disclosure, the second group of glass fibers are distributed through the thickness of the filter sheet media, the filter sheet media having more second group of glass fibers near the first surface than the second surface, thus creating a fiber distribution gradient. The distribution of the second group of fibers can be determined for example by determining the number of individual fibers per area or by optically measuring the area covered by the second group of glass fibers and comparing that to another area in another location at the thickness direction. For example, the number of individual fibers near the first surface and the second surface is measured from pictures taken with a scanning electron microscope (SEM). The ratio of the amount of fibers near the first surface and the second surface is then calculated to determine a ratio of the fiber distribution gradient.

A following procedure may also be used for determining the fiber distribution gradient: Samples of the media are prepared by vertically embedding them in an epoxy resin and further metallographic polishing to produce good quality cross sections. A series of pictures are taken across the thickness using an SEM and the backscattered detector with a large enough magnification so that the second group of glass fibres are easily viewed as white objects over a darker background. Alternatively, SEM-EDX elemental maps are acquired, in which Silicon is used as the elemental marker for glass fibres and silicon pixels are marked in red, in effect producing an image where the fibres are red over a grey background. Image analysis is then used to extract the total number of pixels belonging to the second group of glass fibres and an area fraction for them is computed by dividing this number by the total number of pixels in the image. Statistically relevant amount of pictures (such as at ten to twenty pictures) are taken and processed at each depth location along the cross-sections before the concentration of the second group of glass fibres at this depth is reported as the average of all area fractions measured for each single image. Repeating this procedure at various measured depth across the sections finally yields a distribution curve of the second group of glass fibers across the thickness of the filter sheet media. This curve is a good estimate of the gradient properties of the second group of glass fibers. The fiber distribution gradient can also be determined by other similar methods known to those skilled in the art such as the ones disclosed in sections 161-167 of US-2010/0187171A1.

Density gradient refers to the distribution of all fibers across the thickness of the media. In the current disclosure, there is a change in density along the thickness of the media, with overall more amount of fibers distributed nearer to one side or surface of the media, resulting in a density gradient across the thickness of the media. The density gradient may be measured by following method.

Samples of the material are prepared by vertically embedding them in an epoxy resin and further metallographic polishing to produce good quality cross sections. An area large enough so that the second group of glass fibres are easily viewed as white objects over a darker background is acquired using an SEM with a backscattered detector; this is done by reconstructing a large mosaic from many single high magnification images. Image analysis is then used to extract the pixels belonging to the fibers and each fiber's size in pixels and its vertical position from the top of the section is measured. The sample thickness is divided in at least ten slices, each one becoming a depth bracket within the sample.

The fibers are affected to a depth bracket, depending on their vertical position and the total number pixels belonging to fibers within each depth bracket is computed. This produces a depth/position distribution of all fibers across the thickness. This curve is a good estimate of the gradient properties of all the fibers.

According to an embodiment of the disclosure the second group of glass fibers are distributed over the thickness direction in a fiber distribution gradient range of from 1:1.5 to 1:10, more preferably from 1:6. This means for example that there may be 1.5 times more second group of glass fibers near the first surface of the filter sheet media than in proximity of the second surface. The other end of the gradient range, 1:10 means that there are 10 times more second group of glass fibers near the first surface. According to an embodiment of the disclosure the second group of glass fibers are distributed over the thickness direction in a fiber distribution gradient of a linear, exponential, logarithmic or other curved manner. Thus it is also possible, the fiber distribution gradient may develop from zero value until at given thickness where the distribution starts to increase. It may also decrease near the first surface, e.g., there may be a layer with less second group of glass fibers just in close proximity or near the first surface, thus creating a non-continuous or asymmetrical curve of fiber distribution gradient in thickness direction.

According to an embodiment of the disclosure the fibers in the filter sheet media consist of the first group of glass fibers and the second group of glass fibers. This embodiment means that 100% of the fiber content belong to either the first group of glass fibers or the second group of glass fibers. Another embodiment is that the fibers in the filter sheet media comprises the first group of glass fibers, the second group of glass fibers and other fibers. These other fibers may be natural or synthetic fibers for different purposes, for example carbon fibers for structurally enforcing the filter sheet media.

According to an embodiment of the disclosure the fiber diameter of glass fibers of the first group is more than 2 µm larger than the fiber diameter of the glass fibers of the second group. The fibers in each group must be chosen such that the filter sheet media is characterized by a filtration performance of at least standard EN779:2012 class M6 filter sheet media. For example, as a good starting point, the first group of fibers may be chosen to have a fiber diameter that is more than 2 microns larger than the fiber diameter of the second group of fibers. And contrary, if the parameters are selected randomly or intentionally selecting the opposite parameters of each feature, this may in some instances produce an unwanted result that the filter sheet media does not meet the criteria. However, this may not be the case in all instances.

According to an embodiment of the disclosure, the first group of glass fibers are chopped, cut or stapled to have an even fiber length in a range of about 3 mm to about 20 mm. The first group of glass fibers may also have an aspect ratio of at least 1000, wherein the fiber length is about 1000 times the diameter of the fiber, such as 6 µm on fiber diameter and 6 mm in length.

Still according to an embodiment of the disclosure the filter media is adapted to fulfil criteria of standard EN779:2012 class F7 filter sheet media by the composition comprising: first group of glass fiber from 60 to 70 wt % of the fiber content of the filter sheet media; second group of glass fibers from 30 to 40 wt % of the fiber content of the filter sheet media; a binder from 10 to 20 wt % of the total weight of the filter sheet media.

According to an embodiment of the disclosure the foam properties are being controlled with a foam forming agent and mixing parameters of the furnish. This enables the foam suspension containing the second group of glass fibers to mix properly with the foam suspension containing the first group of glass fibers to be able to provide the wanted fiber distribution gradient of the second group of glass fibers.

The exemplary embodiments of the disclosure presented in this patent application are not to be interpreted to pose limitations to the applicability of the appended claims. The verb "to comprise" is used in this patent application as an open limitation that does not exclude the existence of also unrecited features. The verb "consist of" is used in this patent application as a closed limitation. The features recited in depending claims are mutually freely combinable unless otherwise explicitly stated. The novel features which are considered as characteristic of the disclosure are set forth in particular in the appended claims.

BRIEF DESCRIPTION OF DRAWINGS

In the following, the disclosure will be described with reference to the accompanying exemplary, schematic drawings, in which.

DETAILED DESCRIPTION

Figure 1:
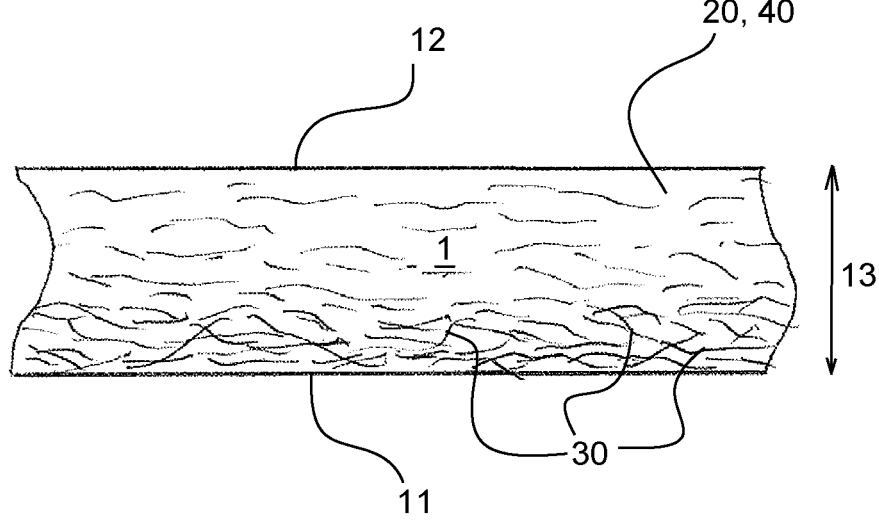
FIG. 1 illustrates a filter sheet media according to an embodiment of the disclosure.

FIG. 1 depicts schematically a filter sheet media 1 for air and gas filtering applications. The filter sheet media comprises at least the following components: a first group of glass fibers 20 (not explicitly depicted on the FIG. 1) having a fiber diameter in a range of greater or equal to 6 µm up to 20 µm; a second group of glass fibers 30 having a fiber diameter in a range of 0.2 µm to less than 6 µm; a binder 40 (not explicitly depicted on the FIG. 1) for adhering the first group of glass fibers 20 to each other and further adhering the second group of glass fibers 30 to the first group of glass fibers 20; wherein the components have formed as a filter sheet media 1 having a first surface 11 and a second surface 12 and a thickness 13 in a direction perpendicular to the first surface 11 and the second surface 12, the filter sheet media 1 fulfils at least criteria of standard EN779:2012 class M6 filter media. The filter sheet media composition comprises: the first group of glass fibers 20 from 60 wt % to 90 wt % of the fiber content of the filter sheet media 1; the second group of glass fibers 30 from 10 wt % to 40 wt % of the fiber content of the filter sheet media; and the second group of glass fibers 30 have a fiber distribution gradient over the thickness 13 of the filter sheet media 1 so that the second group of glass fibers 30 are distributed through the thickness 13 of the filter sheet media 1, the filter sheet media 1 having more second group of glass fibers 30 near the first surface 11 than the second surface 12. The first group of glass fibers 20 and binder 40 are not explicitly depicted in FIG. 1 to enhance the visual presentation of fiber distribution gradient of second group of glass fibers 30. Thus, all the small fibers shown in FIG. 1 represent the fibers of the second group of glass fibers. As can also be noted, the first surface 11 is in this embodiment the lower surface, normally referring to the wire side of a produced web or sheet.

Figure 2:
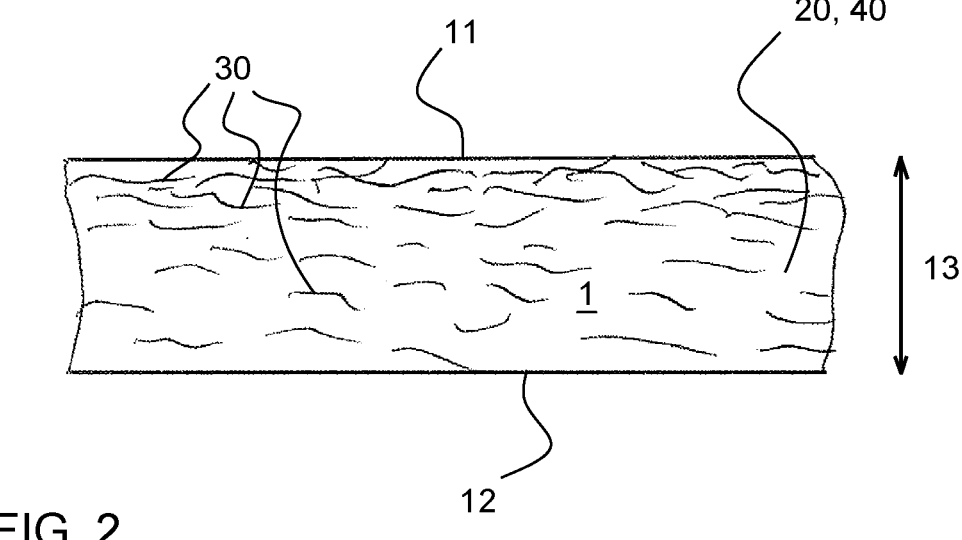
FIG. 2 illustrates a filter sheet media according to another embodiment of the disclosure.

FIG. 2 depicts schematically a filter sheet media 1 for air and gas filtering applications. The filter sheet media comprises at least the following components: a first group of glass fibers 20 (not shown in FIG. 2) having a fiber diameter in a range of greater or equal to 6 μm up to 20 μm; a second group of glass fibers 30 having a fiber diameter in a range of 0.2 μm to less than 6 μm; a binder 40 (not shown in FIG. 2) for adhering the first group of glass fibers 20 to each other and further adhering the second group of glass fibers 30 to the first group of glass fibers 20; wherein the components have formed as a filter sheet media 1 having a first surface 11 and a second surface 12 and a thickness 13 in a direction perpendicular to the first surface 11 and the second surface 12, the filter sheet media 1 fulfils at least criteria of standard EN779:2012 class M6 filter media. The filter sheet media composition comprises: the first group of glass fibers 20 from 60 wt % to 90 wt % of the fiber content of the filter sheet media 1; the second group of glass fibers 30 from 10 wt % to 40 wt % of the fiber content of the filter sheet media; and the second group of glass fibers 30 have a fiber distribution gradient over the thickness 13 of the filter sheet media 1 so that the second group of glass fibers 30 are distributed through the thickness 13 of the filter sheet media 1, the filter sheet media 1 having more second group of glass fibers 30 near the first surface 11 than the second surface 12. The first group of glass fibers 20 and binder 40 are not explicitly depicted in FIG. 2 to enhance the fiber distribution gradient of second group of glass fibers 30. Thus, all the small fibers shown in FIG. 2 represent the fibers of the second group of glass fibers 30. As can also be noted, the first surface 11 is in this embodiment an upper side, top surface, normally referring to the top side of a produced web or sheet.

Figure 3:
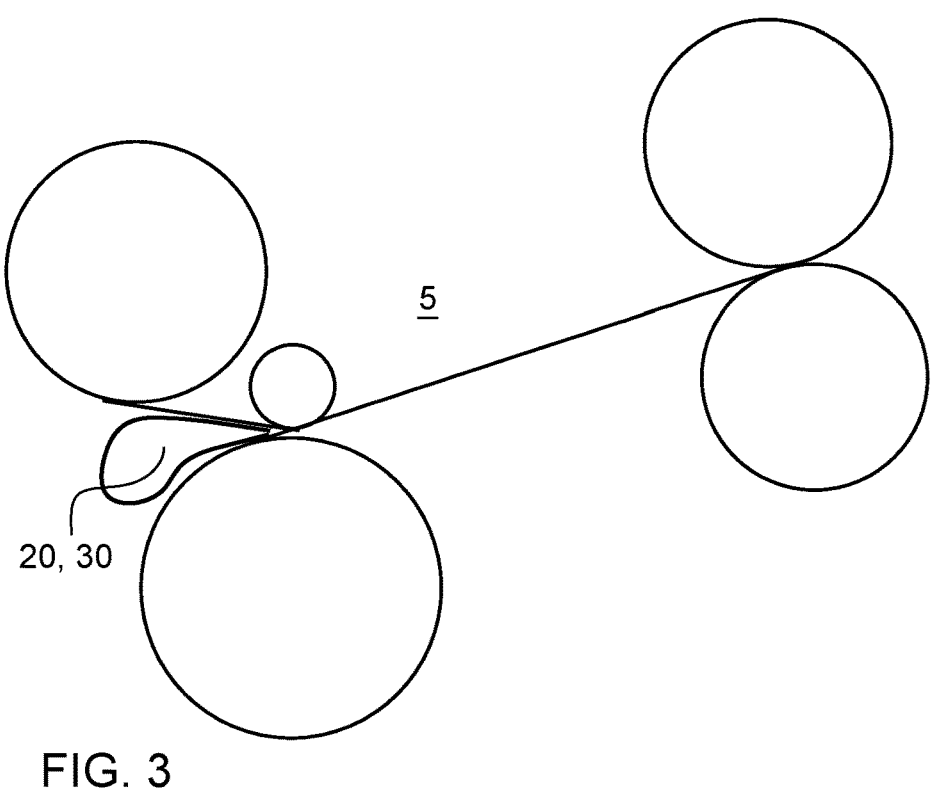
FIG. 3 illustrates a schematic embodiment of a filter sheet media production machine.

FIG. 3 presents a device for utilizing the method for manufacturing the filter sheet media 1. As shown in FIG. 3 a single layer inclined (twin) wire former is used for the formation of the web. Fiber suspensions containing both the first group of glass fibers 20 and the second group of glass fibers 30 are first mixed and then guided on the wire where the gradient of second group of glass fibers is produced.

Figure 4:
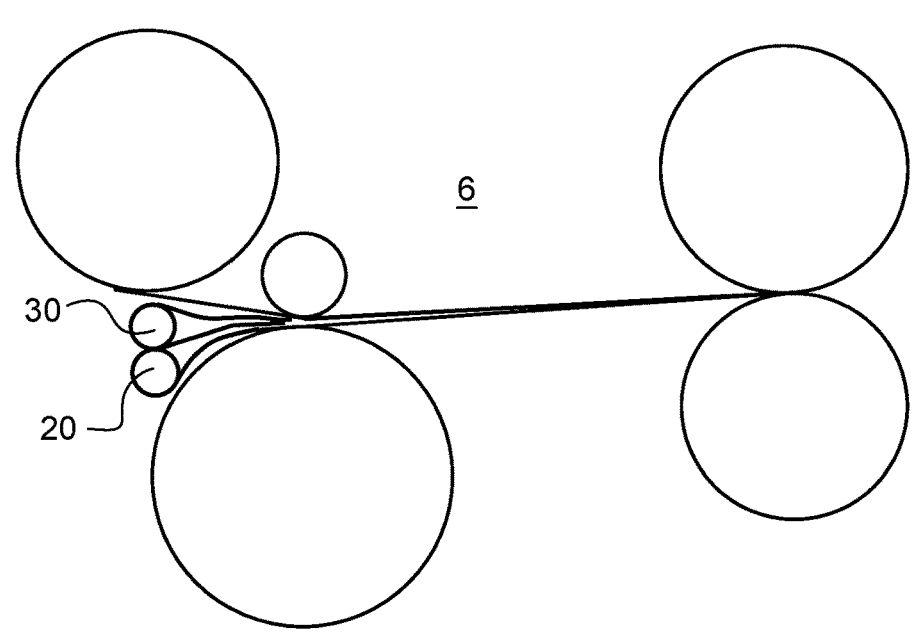
FIG. 4 illustrates a schematic embodiment of another filter sheet media production machine.

FIG. 4 present another device for utilizing the method for manufacturing the filter sheet media 1. As shown in FIG. 4 a multilayer headbox and a former is used for the formation of the web. Fiber suspensions containing the first group of glass fibers 20 and the second group of glass fibers 30 are fed as separate streams from the headbox to the former. Thus, the gradient of second group of glass fibers is obtained by layering the two suspensions.

EXAMPLES

In the following data table 1 it is shown results of experiments where different versions of filter sheet media samples have been produced and then tested. On the top row it is shown which sample is concerned and on rows there is the determined or measured properties. Experiments 1, 2 and 3 are according to the specs of initial inventive scope. On the right-hand columns there are comparative examples 1 and 2 of commercially available EN779:2012 class M6 filter medias. The following test standards have been used to measure the properties:

Basis Weight: TAPPI Standard T410
Caliper: TAPPI Standard T411
Frazier: TAPPI Standard T 251
Penetration @ 0.3 μm: ASTM D2986
Tensile, Elongation: Tappi T494

TABLE 1

| Property | Unit | Experiment 1 | Experiment 2 | Experiment 3 | Comparative Example 1 | Comparative Example 2 |
|---|---|---|---|---|---|---|
| First group of glass fibers | wt % | 65 | 60 | 65 | 15 | 30 |
| Diameter of first group of glass fibers | μm | 10 | 10 | 10 | 6 | 6 |
| Second group of glass fibers | wt % | 35 | 40 | 35 | 83 | 70 |
| Diameter of second group of glass fibers | μm | 2.06 | 2.06 | 2.06 | 3.9 (53 wt %) 5.6 (30 wt %) | 3.9-5.6 |
| Binder | wt % | 13 | 13 | 13 | 10 | 8% |
| gradient observed | yes/no | yes | yes | yes | no | no |
| Basis Weight | g/m² | 55.8 | 59 | 70.3 | 69 | 67.3 |
| Caliper TAPPI T411 | μm | 300 | 325 | 389 | 395 | 362 |
| Density | g/cm³ | 0.186 | 0.182 | 0.181 | 0.175 | 0.19 |
| Frazier | cfm | 122 | 121 | 118 | 115 | 118 |
| Penetration 0.3μ @ 5.32 cm/s | % | 76.4 | 79.2 | 78.7 | 77 | 75.6 |
| DP @ 5.32 cm/s | mm H₂O | 1.1 | 1.1 | 1 | 1.2 | 1.1 |
| Meet the requirement for M6 | yes/no | yes | yes | yes | yes | yes |
| Tensile MD | Kg/15 mm | 2.85 | 3.26 | 3.3 | 2.13 | 1.49 |
| Tensile MD after fold | Kg/15 mm | 1.88 | 1.14 | 2.1 | 0.94 | 0.47 |
| Elongation | % | 1.3 | 1.5 | 0.8 | 1.5 | 0.89 |
| Stiffness MD | mg | 690 | 650 | 1390 | 800 | 1000 |

Results of Experiments

As can be noted, those samples having an observable gradient, wherein the second group of glass fibers are up to 40 wt % seem to produce many desired properties for a highly versatile filter sheet media. The experimental samples have higher tensile strength since there is a higher amount of first group of glass fibers, e.g., using a large amount of the first group of glass fibers gives the media a higher tensile strength. This is reflected in the table above, where the experimental samples have higher tensile strength than the comparative examples. Also, as an example, a variety of different basis weights can be used without adverse effects on the disclosed filter sheet media.

While the disclosure has been described herein by way of examples in connection with what are, at present, considered to be the most preferred embodiments, it is to be understood that the disclosure is not limited to the disclosed embodiments, but is intended to cover various combinations or modifications of its features, and several other applications included within the scope of the disclosure, as defined in the appended claims. The details mentioned in connection with any embodiment above may be used in connection with another embodiment when such combination is technically feasible.

REFERENCE NUMBERS IN FIGURES 1 filter sheet media
11 first surface
12 second surface
13 thickness
20 first group of glass fibers
30 second group of glass fibers
40 binder
5 single layer inclined wire former
6 multilayer headbox

What is claimed is:

1. A filter sheet media (1) for air and gas filtering applications, the filter sheet media (1) comprises:
   a first group of glass fibers (20) having a fiber diameter in a range of greater than or equal to 6 μm up to 20 μm;
   a second group of glass fibers (30) having a fiber diameter in a range of 0.2 μm to less than 6 μm, wherein the second group includes at least one subset of glass fibers with the fiber diameter being greater 1 μm;
   a binder (40) for adhering the first group of glass fibers (20) to each other and further adhering the second group of glass fibers (30) to the first group of glass fibers (20), wherein the binder (40) is from 10 to 20 wt % of the total weight of the filter sheet media (1);
   wherein the filter sheet media (1) has a first surface (11) and a second surface (12) and a thickness (13) in a direction perpendicular to the first surface (11) and the second surface (12),
   wherein the filter sheet media (1) fulfils at least criteria of standard EN779: 2012 class M6 filter media;
   wherein the first group of glass fibers (20) comprises from 60 wt % to 90 wt % of the fiber content of the filter sheet media (1);
   wherein the second group of glass fibers (30) comprises from 10 wt % to 40 wt % of the fiber content of the filter sheet media (1), and have a fiber distribution gradient range of 1:1.5 to 1:10 over the thickness (13) of the filter sheet media (1) such that the second group of glass fibers (30) are distributed through the thickness (13) of the filter sheet media (1), and the filter sheet media (1) has 1.5 to 10 times more second group of glass fibers (30) near the first surface (11) than the second surface (12).

2. A filter sheet media (1) according to claim 1, wherein the second group of glass fibers (30) are distributed over the thickness (13) direction in the fiber distribution gradient range of from 1:1.5 to 1:6.

3. A filter sheet media (1) according to claim 1 or 2, wherein the second group of glass fibers (30) are distributed over the thickness (13) direction in the fiber distribution gradient of a linear, exponential, logarithmic or other curved manner.

4. A filter sheet media (1) according to claim 1, wherein the glass fibers in the filter sheet media (1) consist of the first group of glass fibers (20) and the second group of glass fibers (30).

5. A filter sheet media (1) according to claim 1, wherein the filter sheet media (1) comprises the first group of glass fibers (20), the second group of glass fibers (30) and other fibers.

6. A filter sheet media (1) of claim 1, wherein the fiber diameter of glass fibers (20) of the first group is more than 2 μm larger than the fiber diameter of the glass fibers (30) of the second group.

7. A filter sheet media (1) of claim 1, wherein the first group of glass fibers (20) are chopped, cut or stapled to have even fiber length in a range of 3 mm to 20 mm.

8. A filter sheet media (1) of claim 1, wherein the filter sheet media (1) is adapted to fulfil criteria of standard EN779: 2012 class F7 filter sheet media (1),
   wherein the first group of glass fibers (20) is from 60 to 70 wt % of the fiber content of the filter sheet media (1),
   wherein the second group of glass fibers (30) is from 30 to 40 wt % of the fiber content of the filter sheet media (1), and
   wherein the binder (40) is from 10 to 20 wt % of the total weight of the filter sheet media.

9. A filter sheet media (1) of claim 1, wherein the binder (40) comprises one or more components having an effect on binding properties, a strength of the filter sheet media, hydrophobic/hydrophilic properties, retention properties or foam forming properties.

10. A filter sheet media (1) of claim 1, wherein the binder (40) is selected from a group of acrylates, such as styrene acrylate, acrylic acid resin, ethylene vinyl acetate, polyvinyl acetate, polyvinyl alcohol, starch, styrene butadiene, urea formaldehyde resin, melamine formaldehyde resin, polyurethanes, polycarbonates, saturated polyesters, unsaturated polyesters, polyterpenes, furan polymers, polyfurfural alcohol, polyamides, polyimides, polyamidimides, polyamidoamines, copolymers thereof, and combinations thereof.

11. A filter sheet media (1) of claim 1, wherein the fiber diameter of the second group of glass fibers (30) is in a range of 1 μm to less than 6 μm.

12. A method for manufacturing the filter sheet media (1) of claim 1, the method comprising:
   preparing a furnish for the filter sheet media (1) the furnish comprising:
   the first group of glass fibers (20),
   the second group of glass fibers (30), and
   the binder (40),
   the method further comprising providing the furnish as a foam suspension to a web forming machine (5, 6), to be formed as a web of filter sheet media (1) having the first surface (11) and the second surface (12) and the thickness (13) in the direction perpendicular to the first surface (11) and the second surface (12), and wherein the second group of glass fibers (30) are distributed by a foam laid process so that the second group of glass fibers (30) forms the fiber distribution gradient over the thickness (13) direction of the filter sheet media (1).

13. A method for manufacturing the filter sheet media (1) of claim 12, wherein formation of the web is done by using a single layer inclined twin wire former (5).

14. A method for manufacturing the filter sheet media (1) of claim 12, wherein the fiber distribution gradient is formed by using multilayer headbox (6) and a former.

15. A method for manufacturing the filter sheet media (1) of claim 12, wherein the second group of glass fibers (30) are distributed over the thickness (13) direction in a fiber distribution gradient of a linear, exponential, logarithmic or other curved manner by adjusting the foam properties of the furnish.

16. A method for manufacturing the filter sheet media (1) of claim 12, wherein foam properties are being controlled with a foam forming agent and mixing parameters of the furnish.

17. A method for manufacturing the filter sheet media (1) of claim 12, wherein the filter sheet media (1) is adapted to fulfil criteria of standard EN779: 2012 class F7 filter sheet media, wherein the first group of glass fiber (20) is from 60 to 70 wt % of the fiber content of the filter sheet media (1); wherein the second group of glass fibers (30) is from 30 to 40 wt % of the fiber content of the filter sheet media (1).

\* \* \* \* \*